（12） United States Patent
Kawai

(10) Patent No.: US 11,746,825 B2
(45) Date of Patent: Sep. 5, 2023

(54) TAPERED ROLLER BEARING

(71) Applicant: NTN Corporation, Osaka (JP)

(72) Inventor: Takashi Kawai, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/760,651

(22) PCT Filed: Sep. 14, 2020

(86) PCT No.: PCT/JP2020/034677
§ 371 (c)(1),
(2) Date: Mar. 15, 2022

(87) PCT Pub. No.: WO2021/054279
PCT Pub. Date: Mar. 25, 2021

(65) Prior Publication Data
US 2022/0333640 A1 Oct. 20, 2022

(30) Foreign Application Priority Data

Sep. 19, 2019 (JP) ................................. 2019-170187
Sep. 19, 2019 (JP) ................................. 2019-170276

(51) Int. Cl.
F16C 33/36 (2006.01)
F16C 33/58 (2006.01)
F16C 19/36 (2006.01)

(52) U.S. Cl.
CPC .......... F16C 19/364 (2013.01); F16C 33/366 (2013.01); F16C 33/585 (2013.01); F16C 2220/70 (2013.01)

(58) Field of Classification Search
CPC .... F16C 19/364; F16C 33/366; F16C 33/583; F16C 33/585; F16C 2220/70
See application file for complete search history.

(56) References Cited

U.S. PATENT DOCUMENTS 1,992,682 A * 2/1935 Walters ................. F16C 19/364
384/571
6,086,262 A 7/2000 Matsumoto
6,328,477 B1 12/2001 Tsujimoto et al.
(Continued)

FOREIGN PATENT DOCUMENTS

EP 2503165 B1 * 12/2014 ............ F16C 33/585
JP 4-331813 11/1992
(Continued)

OTHER PUBLICATIONS

International Search Report dated Oct. 27, 2020 in corresponding International (PCT) Patent Application No. PCT/JP2020/034677.
(Continued)

Primary Examiner — Phillip A Johnson
(74) Attorney, Agent, or Firm — Wenderoth, Lind & Ponack, L.L.P.

(57) ABSTRACT

A tapered roller bearing is provided has a grinding undercut with an undercut width A of 0.5 mm or less from a reference point to a large flange surface. The reference point is the intersection point of the imaginary line extending from the generatrix of the raceway surface of the inner ring toward the grinding undercut, and the imaginary line extending from the generatrix of the large flange surface toward the grinding undercut.

20 Claims, 9 Drawing Sheets

(56) References Cited

U.S. PATENT DOCUMENTS

| | | | |
|---|---|---|---|
| 6,379,049 B1 | 4/2002 | Shibazaki et al. | |
| 9,188,160 B2 * | 11/2015 | Liang | F16C 19/364 |
| 9,618,043 B2 * | 4/2017 | Liang | F16C 19/364 |
| 9,683,605 B2 * | 6/2017 | Murata | F16C 19/364 |
| 2014/0294332 A1 * | 10/2014 | Lim | B60B 27/001 |
| | | | 384/569 |
| 2015/0300410 A1 * | 10/2015 | Murata | F16C 33/34 |
| | | | 384/571 |
| 2020/0032842 A1 | 1/2020 | Kawai et al. | |
| 2020/0056655 A1 | 2/2020 | Matsushita et al. | |

FOREIGN PATENT DOCUMENTS

| | | | |
|---|---|---|---|
| JP | 5-87330 | 11/1993 | |
| JP | 11-236920 | 8/1999 | |
| JP | 2000-170774 | 6/2000 | |
| JP | 2000-170775 | 6/2000 | |
| JP | 2001-32843 | 2/2001 | |
| JP | 2017-150649 | 8/2017 | |
| JP | 2018-136027 | 8/2018 | |
| JP | 2018-165552 | 10/2018 | |
| WO | WO-2008052715 A1 * | 5/2008 | ............ F16C 19/364 |
| WO | WO-2014163177 A1 * | 10/2014 | ............ F16C 19/364 |

OTHER PUBLICATIONS

International Preliminary Report on Patentability dated Mar. 15, 2022 in corresponding International (PCT) Patent Application No. PCT/JP2020/034677.

* cited by examiner

TAPERED ROLLER BEARING

TECHNICAL FIELD

The present invention relates to a tapered roller bearing.

BACKGROUND ART

A rolling bearing that supports a rotary part needs to be selected taking into consideration the direction and size of the load which the rolling bearing receives, and the space where the bearing is installed. If a rolling bearing is used to support a rotary part disposed in a transmission (MT, AT, DCT, CVT, a hybrid transmission, etc.) or a differential for an automobile, the rolling bearing is required to be a small-sized bearing even under use conditions where the bearing receives radial, axial, and moment loads. Therefore, as such a rolling bearing, a tapered roller bearing is used, which is capable of receiving both radial and axial loads, and has an excellent capacity for such loads.

In such a tapered roller bearing, a thrust force that pushes the tapered rollers toward the larger-diameter side is generated during operation. Therefore, the inner ring is formed with a large flange for guiding, while supporting, the large end surfaces of the tapered rollers in their revolution direction (circumferential direction), in which the tapered rollers revolve around the center axis of the bearing. The large flange has a large flange surface with which the large end surfaces of the tapered rollers are brought into sliding contact. The inner ring is formed with a grinding undercut extending around the entire circumference, and connecting the large flange surface and the raceway surface of the inner ring to each other.

In general, the shapes of the large end surface of each tapered roller and the large flange surface of the inner ring are designed such that the large end surface and the large flange surface come into contact with each other geometrically at only one point. During operation, the large end surface of each tapered roller comes into sliding contact with the large flange surface of the inner ring in the revolution direction. The sliding contact portions are each present within a generally elongated oval area having a radial short axis with its center located at the above contact point. If the sliding contact portions are not sufficiently lubricated, heat could build up, thereby causing a sharp rise in temperature.

If, as in an automotive transmission, the tapered roller bearing is operated at a high speed and the temperature of lubricating oil is high, a good lubrication mode may not be maintained between the sliding contact portions of the large flange surface of the inner ring and the large end surfaces of the tapered rollers, thereby generating boundary lubrication, so that the sliding contact portions may not be lubricated sufficiently. In order to improve the seizure resistance during operation at a high speed, measures are taken in the shapes and surface properties of the large end surfaces of the tapered rollers and the large flange surface of the inner ring (see discussion of several documents below).

In Japanese Unexamined Patent Application Publication No. 2000-170774, when considering the radius of curvature R of the large end surface of each tapered roller, and the distance $R_{BASE}$ from the vertex of the cone angle of the tapered roller to its contact portion with the large flange surface, by setting $R/R_{BASE}$ within the range of 0.75 to 0.87, it is possible to generate a good wedge effect when lubricating oil is dragged between the large flange surface of the inner ring and the large end surfaces of the tapered rollers, thereby improving the oil film thickness (and thus reducing heat buildup) at the sliding contact portions of these surfaces.

In Japanese Unexamined Patent Application Publication No. 2000-170775, by forming an undercut surface shaped such that the distance between the undercut surface and the large end surface of each tapered roller increases from the radially outer edge of the large flange surface toward the radially inner edge of a chamfer of the large flange, it is possible to increase the effect of the lubricating oil being pulled onto the contact portions of the large end surfaces of the tapered rollers and the large flange surface of the inner ring, and thus to improve the oil film forming capability.

In Japanese Unexamined Patent Application Publication No. 2018-136027, by setting the above ratio $R/R_{BASE}$ within the range of 0.75 to 0.87, and also, by setting, when considering the actual radius of curvature $R_{ACTUAL}$ of the large end surface of each tapered roller, $R_{ACTUAL}/R$ at 0.5 or more, it is possible to reduce heat buildup at the large end surfaces of the tapered rollers and the large flange surface of the inner ring even under severe lubrication conditions, and thus to improve seizure resistance. Especially by introducing a flange portion lubrication coefficient as an indicator showing the level of severity of the lubrication condition, it is possible to increase the workable range of the ratio of $R_{ACTUAL}/R$, and thus to select bearing specifications according to the use conditions.

However, in automotive transmissions or differentials, in order to improve fuel efficiency, there is a growing tendency to reduce the viscosity of lubricating oil or the amount of lubricating oil in a unit, and this tendency is expected to continue. Therefore, rolling bearings are expected to be used under increasingly severer lubrication conditions. Especially in tapered roller bearings, it is increasingly important to ensure oil film thickness at the contact portions of the large end surfaces of the tapered rollers and the large flange surface of the inner ring, and to reduce a rise in temperature due to lubricating oil.

In view of the above-described background, it is an object of the present invention to provide a tapered roller bearing designed such that, even if the tapered roller bearing is used under sever lubrication conditions, a sharp rise in temperature is prevented and the bearing rotates smoothly.

SUMMARY OF THE INVENTION

In order to achieve the above object, the present invention provides a tapered roller bearing comprising: an inner ring; an outer ring; a plurality of tapered rollers disposed between the inner ring and the outer ring; and a cage in which the tapered rollers are received, wherein each of the tapered rollers has: a conical rolling surface; a chamfer continuous with a large-diameter side of the rolling surface; and a large end surface continuous with the chamfer, and wherein the inner ring has: a conical raceway surface; a large flange surface configured to receive the large end surfaces of the tapered rollers; and a groove-shaped grinding undercut connecting the large flange surface and the raceway surface to each other, characterized in that the grinding undercut has an undercut width A of 0.5 mm or less from a reference point to the large flange surface, the reference point being an intersection point of an imaginary line extending from a generatrix of the raceway surface toward the grinding undercut, and an imaginary line extending from a generatrix of the large flange surface toward the grinding undercut.

In the above bearing, since the undercut width A of the grinding undercut of the inner ring is set at a particularly small dimension, i.e., 0.5 mm or less, the width of the large flange surface is wide enough to receive the large end surfaces of the tapered rollers. Therefore, it is possible to optimize the contact relationship between the large flange surface and the large end surfaces of the tapered rollers; and generate a good wedge effect between the large flange surface and the large end surfaces of the tapered rollers so as to improve the oil film forming capability.

Specifically, when considering a cone angle $\beta$ of each of the rolling surfaces, and an acute angle $\rho$ of an imaginary line connecting together a vertex of the cone angle $\beta$ and a contact point of the large flange surface and the large end surface of each of the tapered rollers, relative to the generatrix of the raceway surface, a relationship between $\beta$ and $\rho$ is preferably $\beta/6 \geq \rho$. Since the angle $\rho$, which denotes the radial height of the contact point between the large flange surface and the large end surface of each tapered roller, relative to the reference point, is smaller than $\beta/6$, it possible to prevent a rise in the sliding velocity at the sliding contact portions of the large flange surface and the large end surfaces, thus reducing heat buildup at the large flange surface, and thereby to prevent a sharp rise in temperature.

It is preferable that, when considering an approach angle $\underline{a}$ of the grinding undercut relative to the large flange surface of the inner ring, and an approach angle b of the grinding undercut relative to the raceway surface, a relationship between $\underline{a}$ and b is $\underline{a} > b$, and, when considering the undercut width A from the reference point to the large flange surface, and an undercut width B from the reference point to the raceway surface, a relationship between A and B is A<B. When manufacturing the bearing, in order to set the undercut width A at 0.5 mm or less, it should be taken into consideration that, if the ground amount of the large flange surface overshoots or undershoots relative to the target value during machining, the width of the large flange surface changes depending on the approach angle $\underline{a}$ of the grinding undercut. Since the larger the approach angle $\underline{a}$ relative to the large flange surface, the smaller the amount of change in the width of the large flange surface due to any overshoot or undershoot of the ground amount of the large flange surface, the approach angle $\underline{a}$ is preferably set at a large value. Also, in order to easily discharge chips produced while forming the grinding undercut by turning, it is preferable to satisfy the relationships of a>b and A<B.

When considering a depth c of the grinding undercut relative to the raceway surface of the inner ring, and a depth d of the grinding undercut relative to the large flange surface, a relationship between c and d is preferably c>d. By satisfying this relationship, it is possible to reduce the stress of the large flange of the inner ring caused by loads applied from the large end surfaces of the tapered rollers to the large flange surface of the inner ring, and to improve the strength of the large flange of the inner ring.

The depth d of the grinding undercut relative to the large flange surface of the inner ring is preferably 0.3 mm or less. If this depth is 0.3 mm or less, it is possible to reliably improve the strength of the large flange of the inner ring.

The approach angle $\underline{a}$ of the grinding undercut relative to the large flange surface of the inner ring is preferably within a range of $20° \leq a \leq 50°$. Within this range, it is possible to easily control the undercut width A during grinding of the large end surface.

A width W of the large flange surface preferably satisfies the following Formula 1:

$$W \geq \{Dw \times (\tfrac{1}{2}) \times \tan\theta / (L/Dw)\}, \qquad \text{<Formula 1>}$$

where $\theta$ is an acute angle of the generatrix of the raceway surface relative to a center axis of the inner ring; Dw is a large-end diameter of the rolling surface of each of the tapered rollers; and L is a roller length of each of the tapered rollers. If the width W satisfies Formula 1, it is possible to make the large flange surface sufficiently opposed to the large end surfaces of the tapered rollers. Therefore, even if the sliding contact portions of the large end surfaces of the tapered rollers and the large flange surface of the inner ring are displaced radially outwardly of the of the large flange, it is possible to keep a good contact state therebetween.

A grain size number of old austenite crystal grains in the large flange surface of the inner ring is preferably No. 6 or more. Such a large flange surface is suitable for delaying its surface damage due to metal contact with the large end surfaces of the tapered rollers.

The large flange surface of the inner ring is preferably formed by a nitrided layer having a nitrogen content of 0.05 wt % or more. Such a large flange surface is suitable for delaying its surface damage due to metal contact with the large end surfaces of the tapered rollers.

The large flange surface of the inner ring has a surface roughness of 0.1 μm Ra or less, and the large end surface of each of the tapered rollers has a surface roughness of 0.12 μm Ra or less. Within these ranges, it is possible to improve oil film formation between the large flange surface and the large end surfaces of the tapered rollers.

It is preferable that, when considering set radii of curvature R of the large end surfaces of the respective tapered rollers, and base radii of curvature $R_{BASE}$ from the vertexes of the cone angles of the respective rolling surfaces to the large flange surface of the inner ring, the $R/R_{BASE}$ values are 0.70 or more and 0.95 or less, and, when considering actual radii of curvature $R_{ACTUAL}$ of the large end surfaces of the respective tapered rollers, at least one of the $R_{ACTUAL}/R$ values is 0.3 or more and less than 0.5. In the present invention, since it is possible to improve the oil film forming capability on the side of the large flange surface, it is possible to set each of $R/R_{BASE}$ and $R_{ACTUAL}/R$ within a wide range compared to the tapered roller bearing of Unexamined Patent Application Publication No. 2018-136027 discussed above. As a result, it is possible to improve the yield rate of the tapered rollers, and thus provide the tapered roller bearing at a relatively low cost.

Since the tapered roller bearing of the present invention has improved seizure resistance under severe lubrication conditions, the tapered roller bearing can be suitably used to support a rotary shaft of a transmission or a differential for an automobile Effects of the Invention By using the above structure in the present invention as described above, it is possible to optimize the contact relationship between the large flange surface of the inner ring and the large end surfaces of the tapered rollers, and improve oil film forming capability. Therefore, even if the tapered roller bearing is used under severe lubrication conditions, it is possible to prevent a sharp rise in temperature, and rotate the bearing smoothly.

DETAILED DESCRIPTION OF THE INVENTION

The tapered roller bearing embodying the present invention is now described with reference to the attached drawings.

Figure 2:
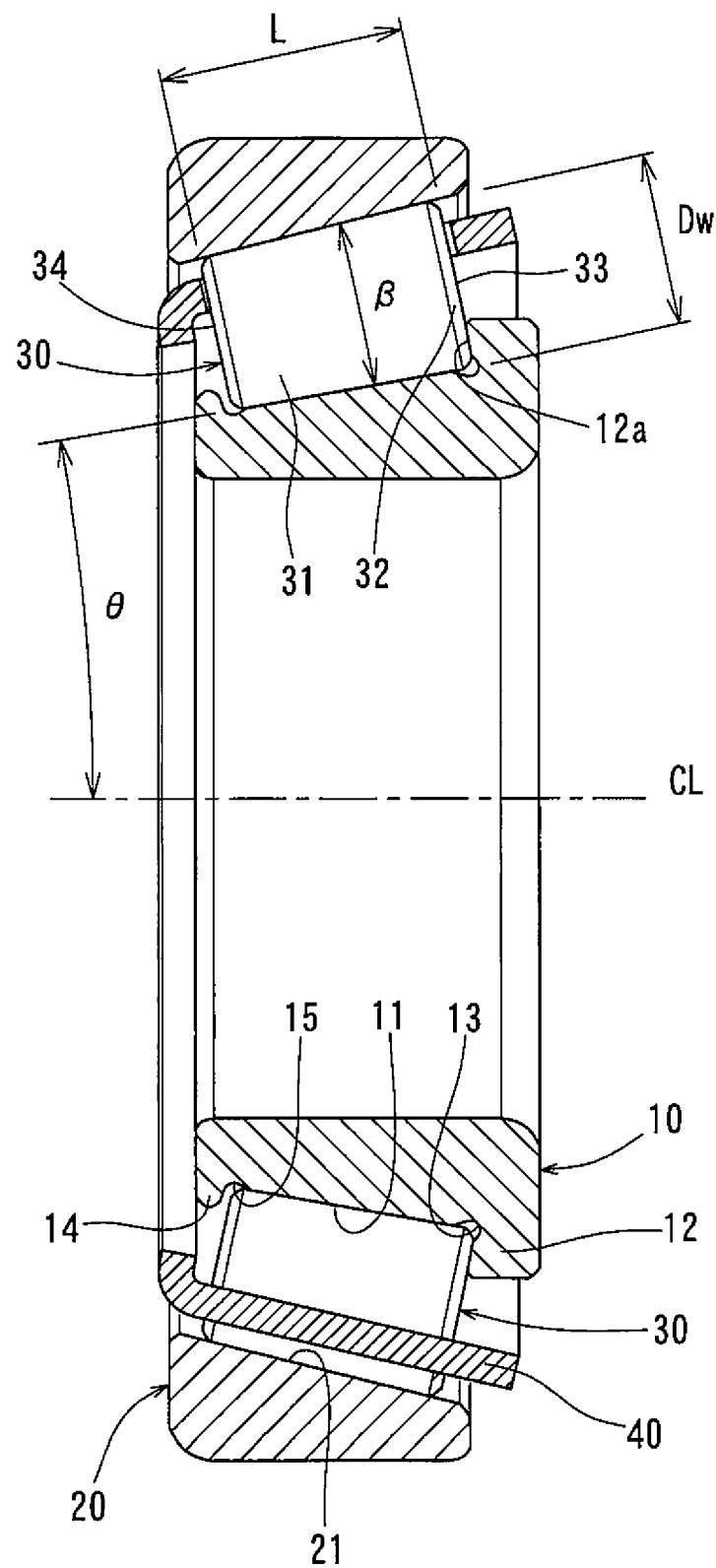
FIG. 2 is a sectional view of the tapered roller bearing of this embodiment.

As illustrated in FIG. 2, this tapered roller bearing includes an inner ring 10; an outer ring 20; a plurality of tapered rollers 30 disposed between the inner ring 10 and the outer ring 20; and a retainer 40 in which these tapered rollers 30 are received. This tapered roller bearing is intended for use in a transmission or a differential for automobiles, mainly for passenger vehicles, and has an outer diameter of 150 mm or less.

Figure 3:
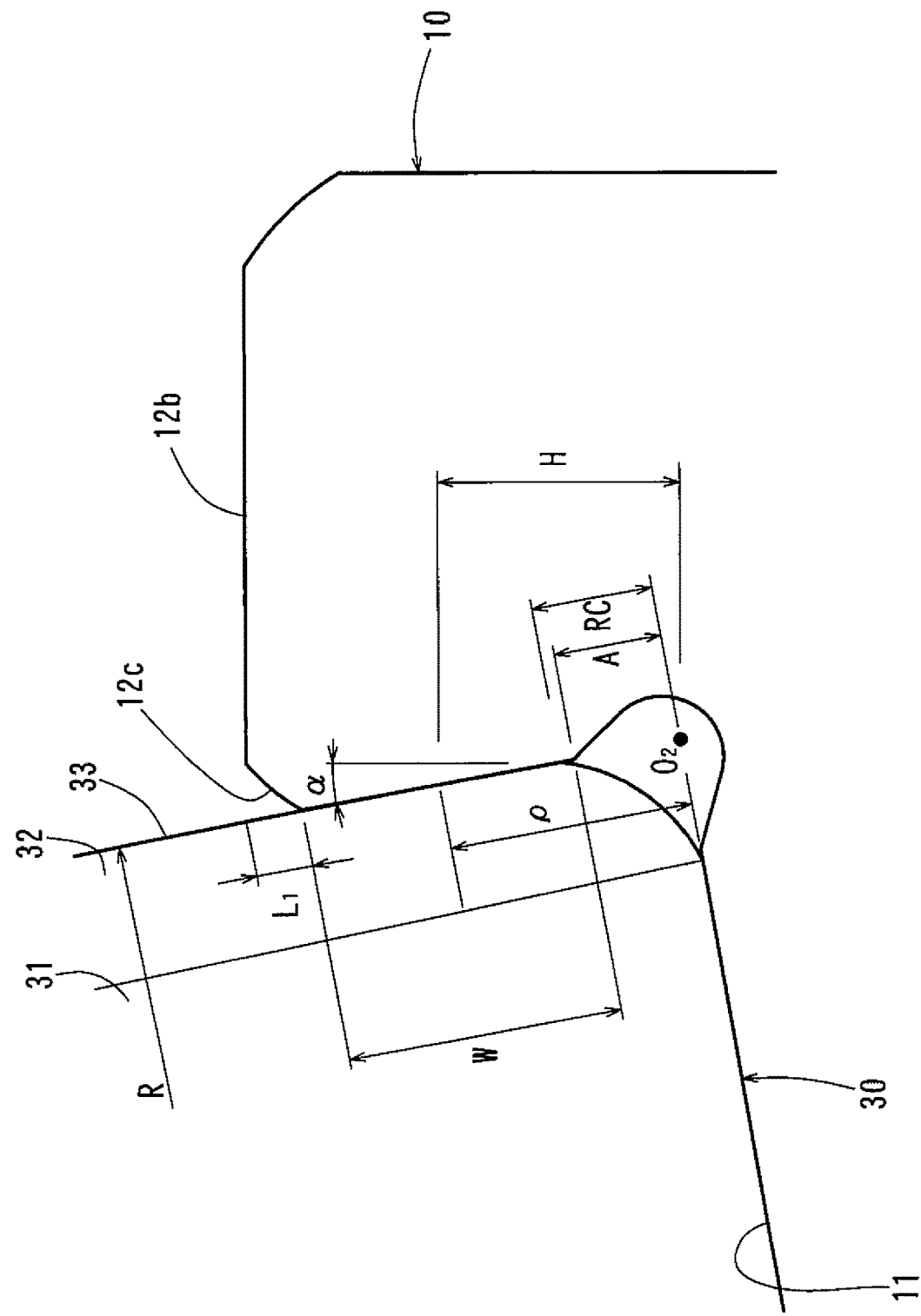
FIG. 3 is a view illustrating a generatrix shape in the vicinity of the large flange surface in an ideal contact state between the large flange surface and the large end surface of each tapered roller of FIG. 2

As illustrated in FIGS. 2 and 3, the inner ring 10 is a bearing ring having, on its outer periphery, a conical raceway surface 11; a large flange 12 having a diameter larger than the diameter of the large-diameter-side edge of the raceway surface 11 on its large-diameter side; a grinding undercut 13 formed from the base of the large flange 12 to the raceway surface 11; a small flange 14 having a diameter larger than the diameter of the small-diameter-side edge of the raceway surface 11 on its small-diameter side; and a small-diameter-side grinding undercut 15 formed from the base of the small flange 14 to the raceway surface 11.

As illustrated in FIG. 2, the outer ring 20 is a bearing ring having a conical raceway surface 21 on its inner periphery. Lubricating oil is supplied to the bearing interior space between the inner ring 10 and the outer ring 20 from the outside of the bearing.

Each tapered roller 30 is a rolling element having a conical rolling surface 31; a chamfer 32 continuous with the large-diameter side of the rolling surface 31; a large end surface 33 continuous with the chamfer 32; and a small end surface 34 formed on the side opposite from the large end surface 33. The large end surface 33 and the small end surface 34 include both ends of the tapered roller 30 that define the roller length L of the tapered roller 30.

The tapered rollers 30 are arranged in a single row between the inner and outer raceway surfaces 11 and 21. The retainer 40 is an annular bearing component that uniformly keeps the circumferential distances between the tapered rollers 30. The tapered rollers 30 are received, respectively, in pockets of the retainer 40 circumferentially equidistantly spaced apart from each other.

While the retainer 40 in the shown example is a cage (cage-shaped member) formed by punching, the material and manufacturing method of the retainer 40 are not particularly limited.

As used herein, the terms "axial" and "axially" are related to the direction along the center axis (rotation axis) CL of the inner ring 10; the terms "radial" and "radially" are related to a direction orthogonal to the center axis CL; and the terms "circumferential" and "circumferentially" are related to the direction around the center axis CL. The tapered roller bearing is designed such that the center axis CL of the inner ring 10 corresponds to the rotation axis of the tapered roller bearing.

The inner and outer raceway surfaces 11 and 21 are surfaces with which the rolling surfaces 31 of the tapered rollers 30 can come into rolling contact, and to which radial loads are applied from the rolling surfaces 31.

Figure 4:
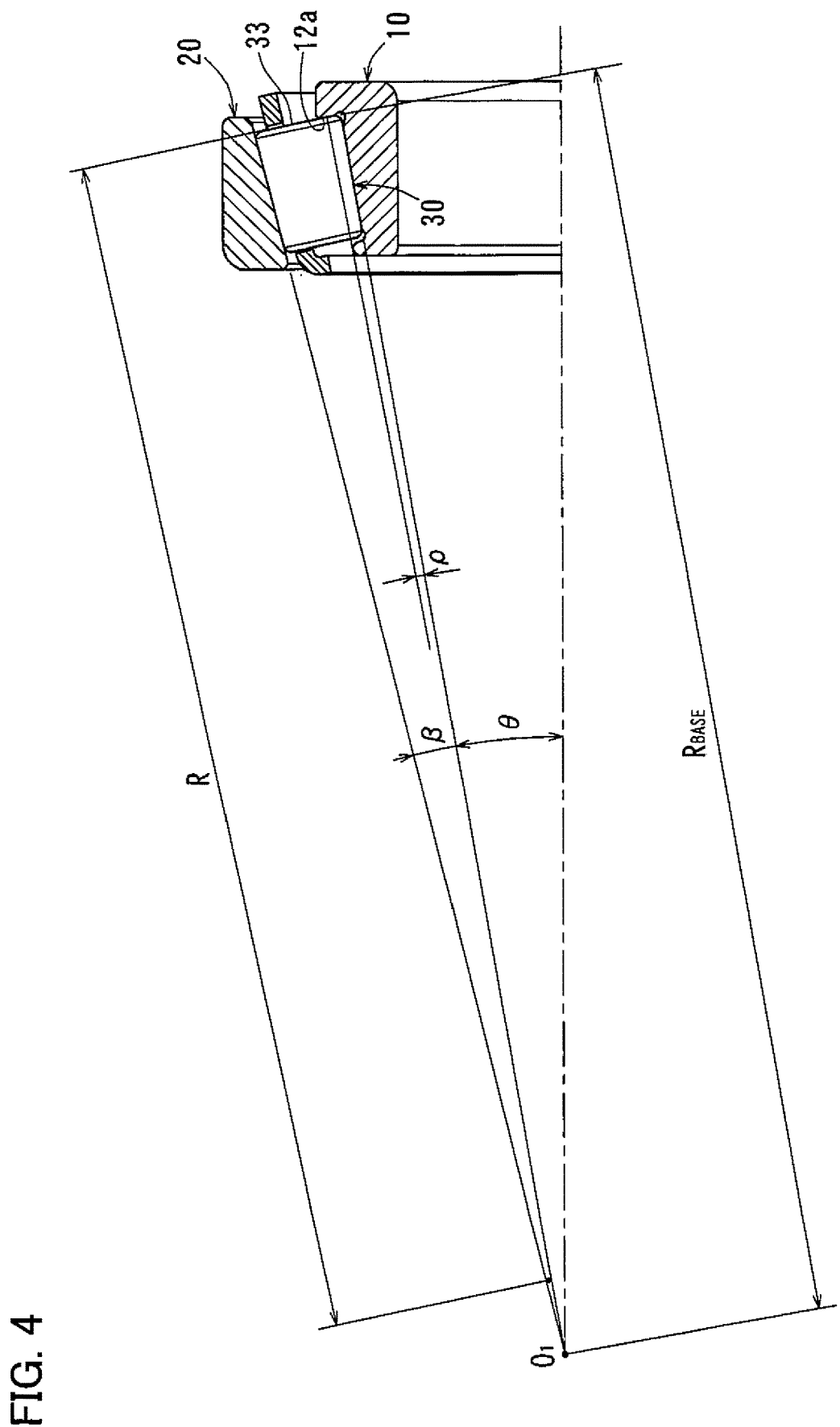
FIG. 4 is a semi-vertical sectional view illustrating the design specifications of the tapered roller bearing of FIG. 2.

As illustrated in FIG. 4, in the positional relationship where the center axes of the inner ring 10, the outer ring 20 and each of the tapered rollers 30 lie in the same imaginary axial plane, and the center axes (not shown) of the tapered rollers 30 are opposed to, and aligned in a straight line with, a point $O_1$ on the center axis CL of the inner ring 10, the vertices of the conical shapes of the inner and outer raceways 11 and 21 and the rolling surfaces 31 of the tapered rollers 30 coincide with the point $O_1$. Each tapered roller 30 is designed such that, in FIG. 4, the large end surface 33 of the tapered roller 30 is defined based on the spherical surface of a set radius of curvature R having its center on the straight line connecting together the point $O_1$ and the center axis of the tapered roller 30.

The conical shapes of the inner and outer raceway surfaces 11 and 21 and the rolling surfaces 31 of the tapered rollers 30 are not limited to shapes generated by a straight generatrix, and it is to be understood that such conical shapes include shapes having crowning. The "generatrix" refers to a line segment that generates a certain curved surface as a trajectory of its motion about a center axis. For example, the generatrix of the raceway surface 11 is a line segment lying on an imaginary axial plane including the center axis CL of the inner ring 10 and forming the raceway surface 11, and the generatrix of the rolling surface 31 of each tapered roller 30 is a line segment lying on an imaginary plane including the center axis of the tapered roller 30 and forming the rolling surface 31. As the shape of the crowning mentioned above, a full-crowning shape or a cut-crowning shape as disclosed in Japanese Unexamined Patent Application Publication No. 2018-136027 (hereinafter JP '027) by the applicant of the present application may be used. As the cut-crowning shape of the rolling surface 31, logarithmic crowning, such as the shape obtained by a numerical formula in Japanese Patent No. 5037094 cited in JP '027, may be used.

As illustrated in FIGS. 2 and 3, the large flange 12 of the inner ring 10 has a large flange surface 12a that receives the large end surfaces 33 of the tapered rollers 30; a radially outer surface 12b that defines the outer diameter of the large flange 12; and a flange-side chamfer 12c that connects together, around the entire circumference, the radially outer edge of the large flange surface 12a, and the radially outer surface 12b. The end face of the large flange 12 opposite from the large flange surface 12a forms a portion of the side surface of the inner ring 10.

The large flange surface 12a is a surface with which the large end surfaces 33 of the tapered rollers 30 are brought into sliding contact in the circumferential direction. The generatrix of the large flange surface 12a is a straight line inclined relative to the radial direction. Therefore, the large flange surface 12a is a conical surface having the same center axis as the raceway surface 11. The large flange surface 12a may have any geometrical shape provided it is capable of coming into contact, at only one point, with the large end surface 33 of each tapered roller 30. For that purpose, its generatrix may be changed into, e.g., a concave generatrix (in this case, the large flange surface comes into surface contact with the roller large end surface, but, for convenience, such contact is also interpreted as a point contact at the contact position between the concave bottom and the roller large end surface), or the generatrix may be a convex generatrix.

The grinding undercut 13 of the inner ring 10 is groove-shaped and connects together the large flange surface 12a and the raceway surface 11. The groove-shaped grinding undercut 13 extends around the entire circumference, and is formed for grinding and super-finishing the raceway surface 11 and the large flange surface 12a. The grinding undercut 13 has depths relative to the raceway surface 11 and the large flange surface 12a, respectively.

As illustrated in FIG. 2, the small flange 14 of the inner ring 10 prevents the tapered rollers 30 from falling off from the raceway surface 11 to the small-diameter side, thereby forming an assembly of the tapered rollers 30, the cage 40, and the inner ring 10. The small flange 14 is not an essential element of the inner ring, and thus the small-diameter-side grinding undercut 15, which is adopted if the small flange is formed, is also not an essential element.

The inner ring 10, the outer ring 20, and the tapered rollers 30 are formed by first forging, then turning, and finally grinding, their predetermined portions.

The raceway surface 11 and the large flange surface 12a of the inner ring 10 are formed by turning and grinding a forged object, and are polished by super-finishing.

Figure 1:
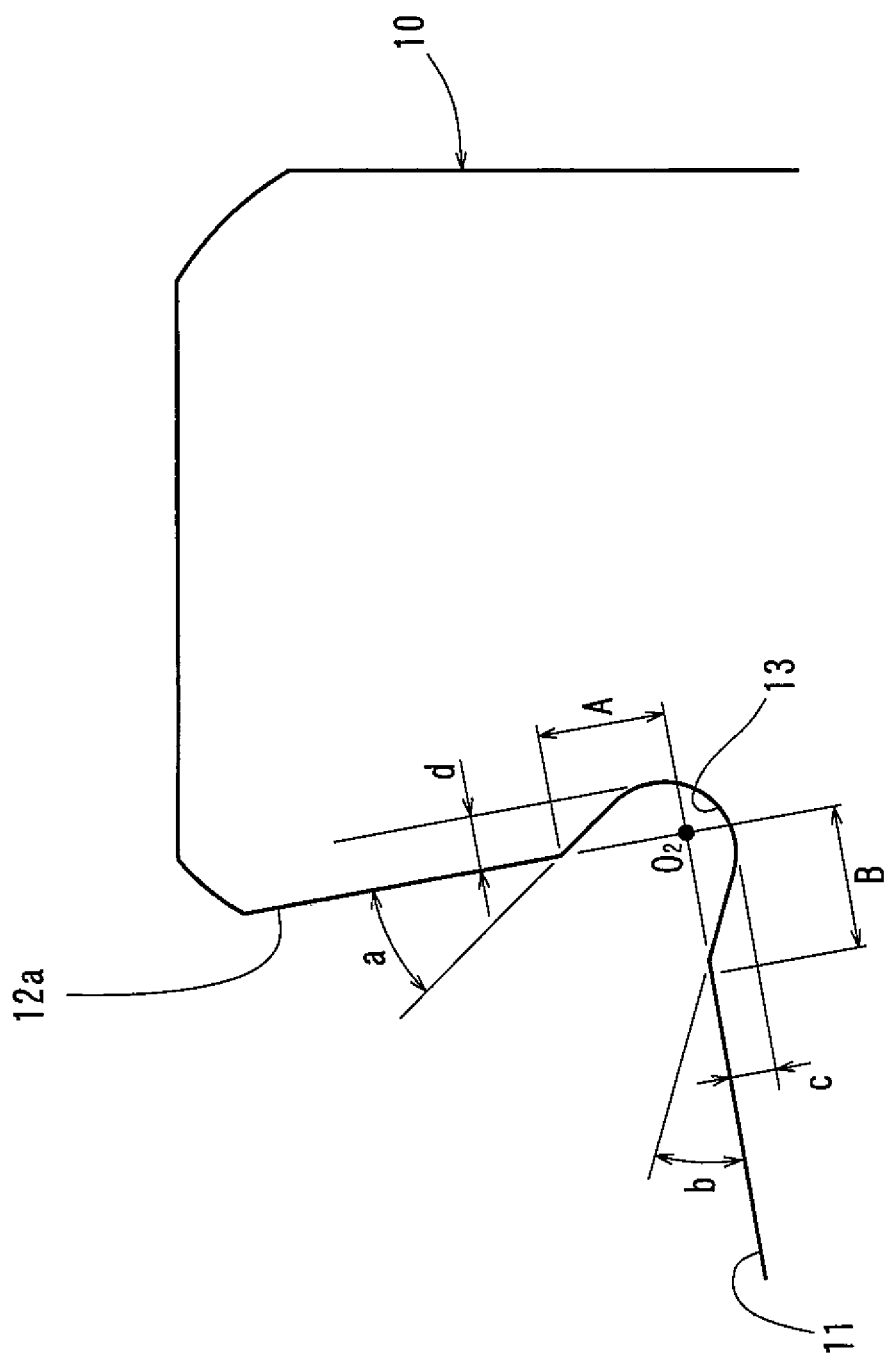
FIG. 1 is a view illustrating a generatrix shape in the vicinity of a large flange surface of a tapered roller bearing according to an embodiment of the present invention.

As illustrated in FIGS. 1 and 3, the grinding undercut 13 of the inner ring 10 is formed by turning based on a predetermined generatrix shape. After turning, the generatrix of the grinding undercut 13 is defined by a large-diameter-side straight line portion inclined from the large flange surface 12a; a small-diameter-side straight line portion inclined from the raceway surface 11; and a circular arc-shaped line portion coupling together the large-diameter-side straight line portion and the small-diameter-side straight line portion. Grinding and super-finishing are not actively performed on the grinding undercut 13, but, when grinding the raceway surface 11 and the large flange surface 12a, the grinder slightly rounds the large-diameter-side end of the ground portion of the raceway surface, and the inner-diameter-side end of the ground portion of the large flange surface. Therefore, although substantially the entire surface of the grinding undercut 13 is a turned surface, the connection portions of the grinding undercut 13 connected to the raceway surface 11 and the large flange surface 12a have slightly rounded ground surfaces or super-finished surfaces.

The intersection point (in FIG. 1) of the imaginary line extending from the generatrix of the raceway surface 11 of the inner ring 10 toward the grinding undercut 13, and the imaginary line extending from the generatrix of the large flange surface 12a toward the grinding undercut 13 is referred to as the reference point $O_2$. The approach angle of the grinding undercut 13 relative to the large flange surface 12a is referred to as the approach angle $a$. The approach angle of the grinding undercut 13 relative to the raceway surface 11 is referred to as the approach angle b. The depth of the grinding undercut 13 relative to the raceway surface 11 is referred to as the depth c. The depth of the grinding undercut 13 relative to the large flange surface 12a is referred to as the depth d. The undercut width of the grinding undercut 13 from the reference point $O_2$ to the large flange surface 12a is referred to as the undercut width A. The undercut width of the grinding undercut 13 from the reference point $O_2$ to the raceway surface 11 is referred to as the undercut width B.

The approach angles $a$ and b, the undercut widths A and B, and the depths c and d are physical quantities to define the shape of the grinding undercut 13. Of these physical quantities, since the degrees of the above-described roundness at the connection portions of the grinding undercut 13 connected to the raceway surface 11 and to the large flange surface 12a are unstable, it is difficult to use these connection portions to define the approach angles $a$ and b. Therefore, the inclination angles of the turned surface of the grinding undercut 13 relative to the large flange surface 12a and the raceway surface 11 are used as the approach angles $a$ and b, respectively.

Specifically, the approach angle $a$ of the grinding undercut 13 is the angle (acute angle) of the large-diameter-side straight line portion of the generatrix of the grinding undercut 13, relative to the radially inner edge of the large flange surface 12a. The approach angle b of the grinding undercut 13 is the angle (acute angle) of the small-diameter-side straight line portion of the generatrix of the grinding undercut 13, relative to the large-diameter-side edge of the raceway surface 11.

The undercut width A of the grinding undercut 13 is the distance from the radially inner edge of the large flange surface 12a to the reference point $O_2$ in the direction along the generatrix of the large flange surface 12a. The undercut width B of the grinding undercut 13 is the distance from the large-diameter-side edge of the raceway surface 11 to the reference point $O_2$ in the direction along the generatrix of the raceway surface 11.

The approach angle $a$ of the grinding undercut 13 is larger than its approach angle b. If the ground amount of the large flange surface 12a by grinding (amount by which the large flange surface 12a is ground in the direction orthogonal to the generatrix of the large flange surface 12a) overshoots or undershoots the target value, the width W (see FIG. 3) of the large flange surface 12a changes depending on the approach angle $a$ of the grinding undercut 13. The width W of the large flange surface 12a is the distance between both ends of the generatrix of the large flange surface 12a. Since, in the shown example, the generatrix of the large flange surface 12a is a straight line, the length of the generatrix corresponds to the width W. The larger the approach angle $a$, see FIG. 1, the smaller the amount of change in the width W of the large flange surface 12a. In other words, the larger the approach angle $a$, the smaller the influence of the overshoot or undershoot of the ground amount of the large flange surface 12a relative to the target value, on the undercut width A.

The approach angle $a$ of the grinding undercut 13 is preferably 20 degrees or more and 50 degrees or less. Within this range, the influence of any overshoot or undershoot of the ground amount of the large flange surface 12a, on the undercut width A, is moderate, thus making it possible to easily control the undercut width A. The approach angle a is more preferably 30 degrees or more and 40 degrees or less.

The depth c of the grinding undercut 13 is the depth of the grinding undercut 13 relative to the large-diameter-side edge of the raceway surface 11, in the direction orthogonal to the imaginary line extending from the generatrix of the raceway surface 11. The depth d of the grinding undercut 13 is the depth of the grinding undercut 13 relative to the radially inner edge of the large flange surface 12a, in the direction orthogonal to the imaginary line extending from the generatrix of the large flange surface 12a.

The depth c of the grinding undercut 13 is larger than its depth d. This is in order to prevent thinning of the wall thickness of the inner ring 10 between the side surface of the inner ring 10 and the grinding undercut 13. In order to keep this wall thickness sufficiently large, the depth d is preferably 0.3 mm or less.

The undercut width A of the grinding undercut 13 is smaller than its undercut width B. Setting the undercut width A smaller than the undercut width B is advantageous in making the approach angle a larger than the approach angle b. The grinding undercut 13 is formed by turning. Chips generated by turning can be more easily discharged from the grinding undercut 13 toward the raceway surface 11, where a relatively wide space is available, than toward the large flange surface 12a. Therefore, by discharging the chips toward the raceway surface 11, the grinding undercut 13 can be more efficiently formed by turning. By satisfying the approach angles a>b and the undercut widths A<B regarding the grinding undercut 13, the discharge pressure of the chips during turning is relatively small on the side of the approach angle b and the undercut width B, and thus the chips are easily discharged toward the raceway surface 11. It is thus possible to improve the turning machinability, and reduce the machining cost.

The undercut width A of the grinding undercut 13 is 0.5 mm or less. The reason why such a small undercut width A is used is to decrease the inner diameter of the large flange surface 12a, thereby, as illustrated in FIG. 3, sufficiently widening the width W of the large flange surface 12a, which is opposed to the large end surfaces 33 of the tapered rollers 30. Widening the width W of the large flange surface 12a is advantageous in that, even if the positions of the sliding contact portions of the large flange surface 12a and the large end surfaces 33 of the tapered rollers 30 are displaced, a good contact state is maintained between the large flange surface 12a and the large end surfaces 33 of the tapered rollers 30.

The undercut width A of the grinding undercut 13 is smaller than the width RC of the chamfer 32 of each tapered roller 30 in the direction along the generatrix of the large flange surface 12a. This is in order to prevent the sliding contact portions of the large flange surface 12a and the large end surfaces 33 of the tapered rollers 30 from being displaced to the radially inner edge of the large flange surface 12a. The width RC of the chamfer 32 of each tapered roller 30 can be set at, e.g., 0.7 mm or less.

In FIGS. 2 and 4, the acute angle of the generatrix of the raceway surface 11 relative to the center axis CL of the inner ring 10 is denoted by θ. The large-end diameter of the rolling surface 31 of each tapered roller 30 at its large end is denoted by Dw. In the geometric relationship among the inclination angle θ of the raceway surface 11, the large-end diameter Dw of the rolling surface 31, and the roller length L (see FIG. 2), the width W (see FIG. 3) of the large flange surface 12a satisfies the following Formula 1:

$$W \geq \{Dw \times (½) \times \mathrm{Tan}\,\theta / (L/Dw)\} \qquad \text{<Formula 1>}$$

Formula 1 determines the lower limit of the width W of the large flange surface 12a in maintaining a good contact state between the large flange surface 12a of the inner ring 10 and the large end surfaces 33 of the tapered rollers 30 shown in FIGS. 2 and 3. Specifically, while a radial load (or a dynamic equivalent load which is a combined load of a radial load and an axial load) is being applied to this tapered roller bearing, due to the inclination angle θ of the raceway surface 11, the radial load is distributed and applied to the raceway surface 11 and the large flange surface 12a. In Formula 1, the ratio of this distribution is denoted by Tan θ, and Tan θ is multiplied by the large-end diameter Dw of the rolling surface 31, which is closely related to the bearing load capacity. Since, normally, the load applied to the tapered roller bearing during its operation is approximately half or less of the bearing load capacity, the large-end diameter Dw of the rolling surface 31 is multiplied by (½). Further, because the larger the roller length L is, the higher, in the above-described distribution ratio, the ratio of the load received by the raceway surface 11, the relationship between the roller length L and the large-end diameter Dw of the rolling surface 31 is inserted in Formula 1 as $(L/Dw)^{-1}$. Formula 1 thus sets the lower limit value of the width W of the large flange surface 12a according to the applied load. By satisfying Formula 1, even if the sliding contact portions of the large end surfaces 33 and the large flange surface 12a move radially outwardly of the large flange, e.g., by the skew of the tapered rollers 30 or the inclination of the large flange 12 of the inner ring 10 due to a large moment load, it is possible to keep a good contact state therebetween.

The upper limit value of the width W of the large flange surface 12a may be any value (in millimeters) for the purpose of supporting and guiding the large end surfaces 33 of the tapered rollers 30, but this upper limit value is preferably not more than three times the lower limit value of Formula 1. If the width W of the large flange surface 12a (and thus the outer diameter of the large flange surface 12a) is too large, lubricating oil will not easily reach the sliding contact portions of the large flange surfaces 12a and the large end surfaces 33 of the tapered rollers 30, thus making it impossible to ensure a good lubrication state.

The acute angle of the large flange surface 12a relative to the radial direction is referred to as the flange surface angle α (see FIG. 3). The difference in radial height between the reference point $O_2$ and the contact point of the large flange surface 12a and the large end surface 33 of each tapered roller 30 is referred to as the contact point height H (see FIG. 3). The contact point height H is determined in a one-to-one relationship with the combination of the flange surface angle α and a base radius of curvature $R_{BASE}$ of the large end surface 33 of each tapered roller 30. In FIGS. 2 and 4, the cone angle of the rolling surface 31 of each tapered toller 30 is denoted by β. The cone angle β of the rolling surface 31 is the central angle defined by the conical shape of the rolling surface 31 with the vertex $O_1$ of the cone angle β at the center. The letter "ρ" indicates the angle (acute angle) of the imaginary line extending from the contact point between the large flange surface 12a of the inner ring 10 and the large end surface 33 of the tapered roller 30 to the vertex $O_1$ of the cone angle β, relative to the generatrix of the raceway surface 11 is denoted by. As illustrated in FIG. 3, the angle ρ corresponds to the contact point height H. If the large flange surface has a convex curvature toward the large end surface of each tapered roller, or a concave curvature away from the large end surface, the angle ρ will be the angle of the imaginary line extending from the contact point between the large end surface and the deepest portion or the highest portion of the large flange surface.

The circumferential sliding velocity at the contact point between the large flange surface 12a and the large end surface 33 of each tapered roller 30 depends on the contact point height H. If the above contact point is at the reference point $O_2$, which is the imaginary intersection point between the raceway surface 11 and the large flange surface 12a of the inner ring 10 (contact point height H=0), the sliding velocity is zero, and the higher the contact point height H from the reference point $O_2$ is, the higher the sliding velocity is at the contact point. By using a small undercut width A as described above, it is possible to widen the large flange surface 12a toward the grinding undercut 13, thereby reducing the contact point height H. Therefore, the contact point of the large flange surface 12a and the large end surface 33 of each taped roller 30 is located a low position which satisfies $\beta/6 \geq \rho$. Setting the contact point at such a low position is effective in reducing the sliding velocity at the sliding contact portions of the large flange surface 12a and the large end surfaces 33 of the tapered rollers 30, thereby reducing heat buildup at the large flange surface 12a and preventing a sharp rise in the temperature of the large flange surface 12a.

If the width RC of the chamfer 32 of each tapered roller 30 is set to be 0.7 mm or less, the contact point of the large flange surface 12a and the large end surface 33 of the tapered roller 30 can be set at a further lower position that satisfies $\beta/7 \geq \rho$.

Ratio $R/R_{BASE}$, i.e., the ratio of the set radius of curvature R at the large end surface 33 of each of the tapered rollers 30 (one of which is shown in FIG. 4), to the base radius of curvature $R_{BASE}$ from the vertex $O_1$ of the cone angle $\beta$ of the rolling surface 31 to the large flange surface 12a of the inner ring 10; and ratio $R_{ACTUAL}/R$, i.e., the ratio of the actual radius of curvature $R_{ACTUAL}$ of the large end surface 33 to the set radius of curvature R, can be set within the numerical ranges disclosed in JP '027 by the applicant of the present application. Since the details and technical significance of these ratios $R/R_{BASE}$ and $R_{ACTUAL}/R$ are disclosed in JP '027, the ratios $R/R_{BASE}$ and $R_{ACTUAL}/R$ are only summarily described in this embodiment.

Figure 5:
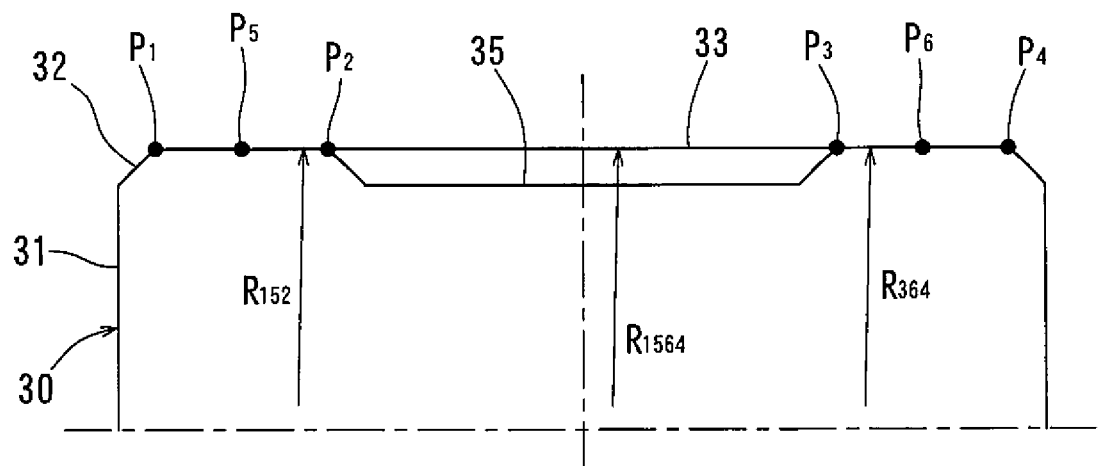
FIG. 5 is a schematic diagram illustrating the detailed shape of the large end surface of each tapered roller of FIG. 2.
Figure 6:
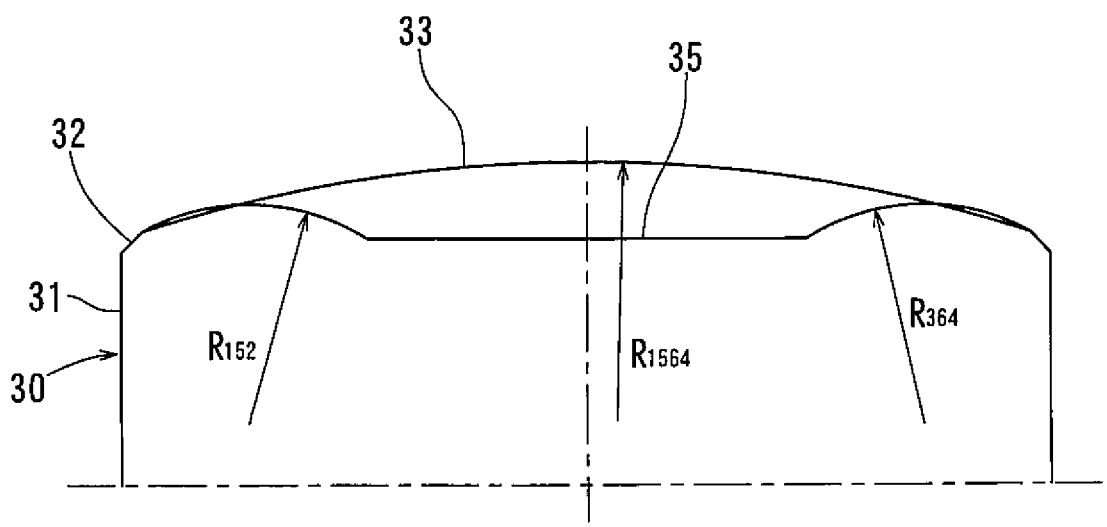
FIG. 6 is a schematic view illustrating the machining shape of the large end surface of the tapered roller of FIG. 5.

Specifically, the set radius of curvature R (see FIG. 4) of the large end surface 33 of the tapered roller 30 is the dimension of the large end surface 33 if it is composed of an ideal spherical surface. When considering FIG. 5, in which:
(i) points $P_1$, $P_2$, $P_3$ and $P_4$ are the ends of the large end surface 33;
(ii) point $P_5$ is the midpoint between points $P_1$ and $P_2$;
(iii) point $P_6$ is the midpoint between points $P_3$ and $P_4$;
(iv) $R_{152}$ is the radius of curvature of the circle passing through the points $P_1$, $P_5$ and $P_2$;
(v) $R_{364}$ is the radius of curvature of the circle passing through points $P_3$, $P_6$ and $P_4$; and
(vi) $R_{1564}$ is the radius of curvature of the circle passing through points $P_1$, $P_5$, $P_6$ and $P_4$,
then the above-described ideal spherical surface satisfies the relation: $R=R_{152}=R_{364}=R_{1564}$. Points $P_1$ and $P_4$ are the connection points between the large end surface 33 and the chamfer 32. Points $P_2$ and $P_3$ are connection points between the large end surface 33 and an undercut 35. Actually, however, as illustrated in FIG. 6, since shear drops are formed at both ends of the large end surface 33 during grinding, the radius of curvature $R_{152}$, $R_{364}$ of the large end surface 33 on each side thereof is not equal to, and is smaller than, the radius of curvature $R_{1564}$ of the entire large end surface 33. The radius of curvature $R_{152}$, $R_{364}$ of the large end surface 33 on each side thereof after machining is referred to as the actual radius of curvature $R_{ACTUAL}$.

The set radius of curvature R and the actual radii of curvature $R_{ACTUAL}$ are obtained as follows: The radius of curvature $R_{1564}$ in FIG. 6 is the radius of an approximate circle passing through four points $P_1$, $P_5$, $P_6$ and $P_4$ in FIG. 5. Measurement of $R_{152}=R_{364}:=R_{1564}$ was performed using a surface roughness measuring device called "Surftest" (model SV-3100; produced by Mitutoyo Corporation). Specifically, using this measuring device, the shape along the generatrix of the large end surface 33 of each tapered roller 30 was obtained, points $P_1$, $P_2$, $P_3$ and $P_4$ were plotted, and then midpoints $P_5$ and $P_6$ were plotted. The radius of curvature $R_{152}$ was calculated as the radius of the circular arc-shaped curved line passing through points $P_1$, $P_5$ and $P_2$ (the radius of curvature $R_{364}$ was also calculated in a similar manner). The radius of curvature $R_{1564}$ was calculated as the radius of an approximate circular arc-shaped curved line based on values obtained by plotting the four points using the command "multiple inputs". The shape of the large end surface 33 along its generatrix was measured once in the diameter direction.

In FIG. 3, the large flange surface 12a of the inner ring 10 comes into sliding contact only with the portion of the large end surface 33 of the tapered roller 30 located on one side thereof, and having the radius of curvature $R_{152}$, $R_{364}$. The radii of curvature of the portions of the large end surface 33 which actually come into contact with the large flange surface 12a are the actual radii of curvature $R_{ACTUAL}$ ($R_{152}$, $R_{364}$), which are smaller than the set radius of curvature R ($R_{1564}$). Due to this difference in radius, the actual contact surface pressure between the large flange surface 12 and the large end surface 33 and the actual skew angle of the tapered roller 30 are larger than the ideal values in design. If the contact surface pressure and/or the skew angle is large in an environment where an oil film is not sufficiently formed, this destabilizes the sliding contact between the large end surface 33 and the large flange surface 12a, thus reducing the oil film parameter. If the oil film parameter falls below 1, the lubrication between the large end surface 33 and the large flange surface 12a becomes boundary lubrication, in which metal contact starts, so that the risk of seizure increases. The oil film parameter is denoted by $\Lambda$ (=h/σ) defined by the ratio of the oil film thickness h obtained by the elastohydrodynamic lubrication theory, to the composite roughness σ which is the root-mean-square roughness value of the large end surface 33 and the large flange surface 12a. The verification of the workable range of the ratio of the actual radii of curvature $R_{ACTUAL}$ to the set radius of curvature R is affected by the level of severity in the lubrication state between the large end surface 33 and the large flange surface 12a at the peak of lubricating oil use temperature.

If the generatrix of the large flange surface 12a has a constant straight-line shape, the lubrication state between the large end surface 33 and the large flange surface 12a is determined by the actual radii of curvature $R_{ACTUAL}$ and the use temperature of the lubricating oil. Since predetermined lubricating oil is basically used in transmissions and differentials, the viscosity of the lubricating oil is also predetermined. Assuming, as the maximum condition at the peak of the use temperature of the lubricating oil, an extremely severe temperature condition under which the peak lasts for 3 minutes (180 seconds) at 120° C., in the lubrication state where the viscosity characteristic of the lubricating oil is added to this assumed peak temperature condition, the threshold value for setting the ratio $R_{ACTUAL}/R$, i.e., the ratio of the actual radius of curvature $R_{ACTUAL}$ to the set radius of curvature R, so as not to generate a sharp rise in temperature, is obtained as a flange lubrication coefficient obtained by flange lubrication coefficient, i.e., flange lubrication coefficient=viscosity at 120° C.×(oil film thickness h)$^2$/180 seconds. The oil film thickness h is obtained by Karna's formula. In view of the contact surface pressure between the large end surface 33 and the large flange surface 12a, the oil film thickness h, the skew angle, and the oil film parameter, it is possible to set $R_{ACTUAL}$/R within a workable range by setting this ratio such that the flange lubrication coefficient exceeds 8×10$^{-9}$ (threshold value).

Turbine oil of ISO viscosity grade VG32, which is a lubricating oil often used in transmissions, has a 120° C. viscosity of 7.7 cSt (=7.7 mm$^2$/s), which is low. Thus, the lubrication state where the viscosity of the lubricating oil is added to the assumed peak temperature condition will be extremely sever conditions. Therefore, the above-described ratio $R_{ACTUAL}$/R is preferably 0.8 or more. For SAE 75W-90, which is a gear lubricating oil often used in differentials, $R_{ACTUAL}$/R is preferably 0.5 or more.

Figure 7:
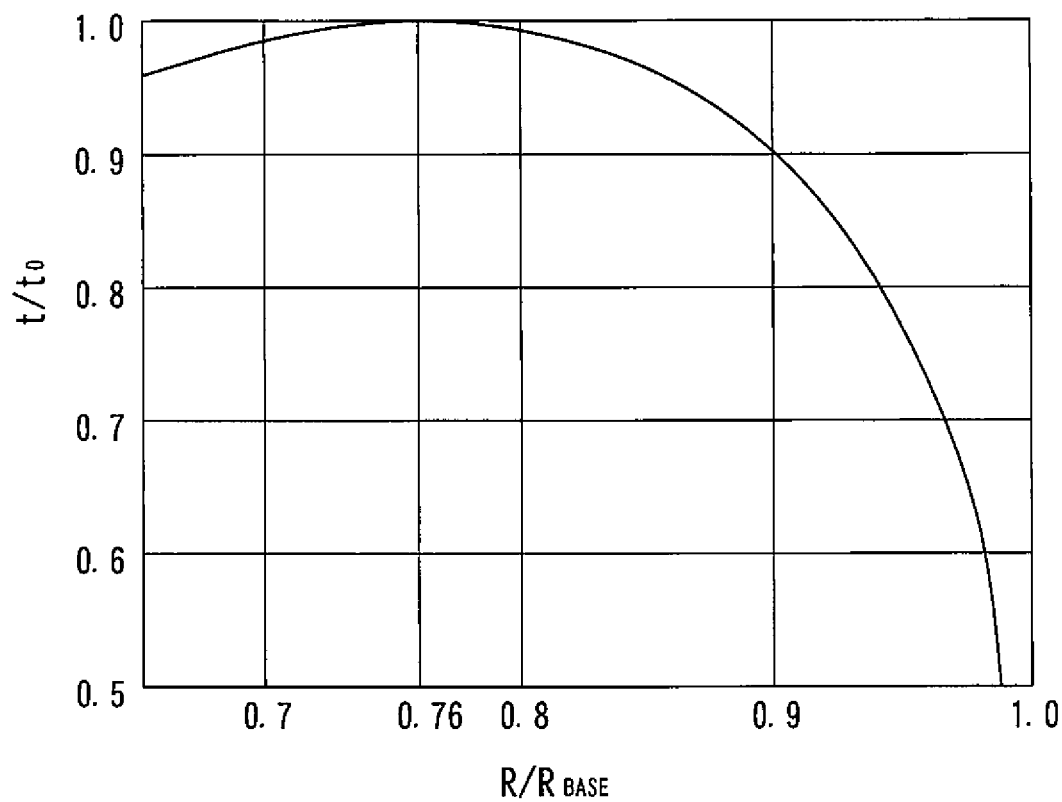
FIG. 7 is a graph showing the relationship between an oil film thickness and the radius of curvature of the large end surface of each tapered roller illustrated in FIG. 2.

The ratio $R/R_{BASE}$, i.e., the ratio of the set radius of curvature R (see FIG. 4) of the large end surface 33 of each tapered rollers 30 (one of which is shown in FIG. 4), to the base radius of curvature $R_{BASE}$ from the vertex $O_1$ of the cone angle β of the rolling surface 31 to the large flange surface 12a of the inner ring 10, relates, as illustrated in FIG. 7, to the oil film forming capability at the sliding contact portion of the large end surface 33 and the large flange surface 12a. The maximum Hertzian stress p at the sliding contact portion of the large end surface 33 and the large flange surface 12a decreases as $R/R_{BASE}$ increases. Also, the skew angle increases as $R/R_{BASE}$ decreases.

The vertical axis of FIG. 7 shows the ratio $t/t_0$, which is the ratio of the oil film thickness t of an oil film formed between the sliding contact portion of each of the large end surfaces 33 (one of which is shown in FIG. 4) and the large flange surface 12a, to the oil film thickness $t_0$ of the oil film when $R/R_{BASE}$ is 0.76. As shown in FIG. 7, the oil film thickness t becomes maximum when $R/R_{BASE}$ is 0.76, and the oil film thickness t decreases sharply when $R/R_{BASE}$ exceeds 0.9. In order to set the oil film thickness at the optimum value, $R/R_{BASE}$ is particularly preferably set at 0.75 or more and 0.87 or less.

In the tapered roller bearing of the present invention, since the large flange surface 12a is optimized such that a good contact state is maintained between the large flange surface 12a and the large end surfaces 33 of the tapered rollers 30, by, as described above, decreasing the undercut width A of the grinding undercut 13, thereby widening the width W of the large flange surface 12a toward the grinding undercut 13, it is possible to expand the allowable range of each of $R/R_{BASE}$ and $R_{ACTUAL}$/R.

Specifically, $R/R_{BASE}$ can be set at 0.70 or more and 0.95 or less, and is preferably 0.70 or more and 0.90 or less, most preferably 0.75 or more and 0.87 or less.

$R_{ACTUAL}$/R can be set at 0.3 or more, and is preferably 0.5 or more, most preferably 0.8 or more. For a completed tapered roller 30 in which $R_{ACTUAL}$/R is within the range of 0.3 or more and less than 0.5, even if there is some disturbance causing displacement of the sliding contact portion, e.g., the skew of the tapered roller 30 or the inclination of the large flange surface 12 due to a large moment load, since the large flange surface 12a is optimized as described above, it is possible to maintain a good contact state between the large flange surface 12 and the large end surface 33 of the tapered roller 30.

This means that one or more of the plurality of completed tapered rollers 30 can have an $R/R_{BASE}$ value of 0.70 or more and 0.95 or less, and/or can have an $R_{ACTUAL}$/R value of 0.3 or more and less than 0.5. Thus, it is possible to improve the yield rate of the tapered rollers 30.

The above-described oil film parameter depends on the composite roughness of the large end surfaces 33 of the tapered rollers 30 and the large flange surface 12a of the inner ring 10. By mirror-finishing the large end surfaces 33 and the large flange surface 12a, it is possible to improve oil film formation, and ensure a suitable oil film thickness. Specifically, the large flange surface 12a has a surface roughness of 0.1 μm Ra or less, preferably 0.08 μm Ra or less. The large end surfaces 33 have a surface roughness of 0.12 μm Ra or less, preferably 0.1 μm Ra or less. The surface roughness refers to arithmetic mean roughness Ra defined in JIS B0601:2013 "Geometric property specifications (GPS) of product—surface properties: Contour curve method—term, definition and surface properties parameter".

Figure 8:
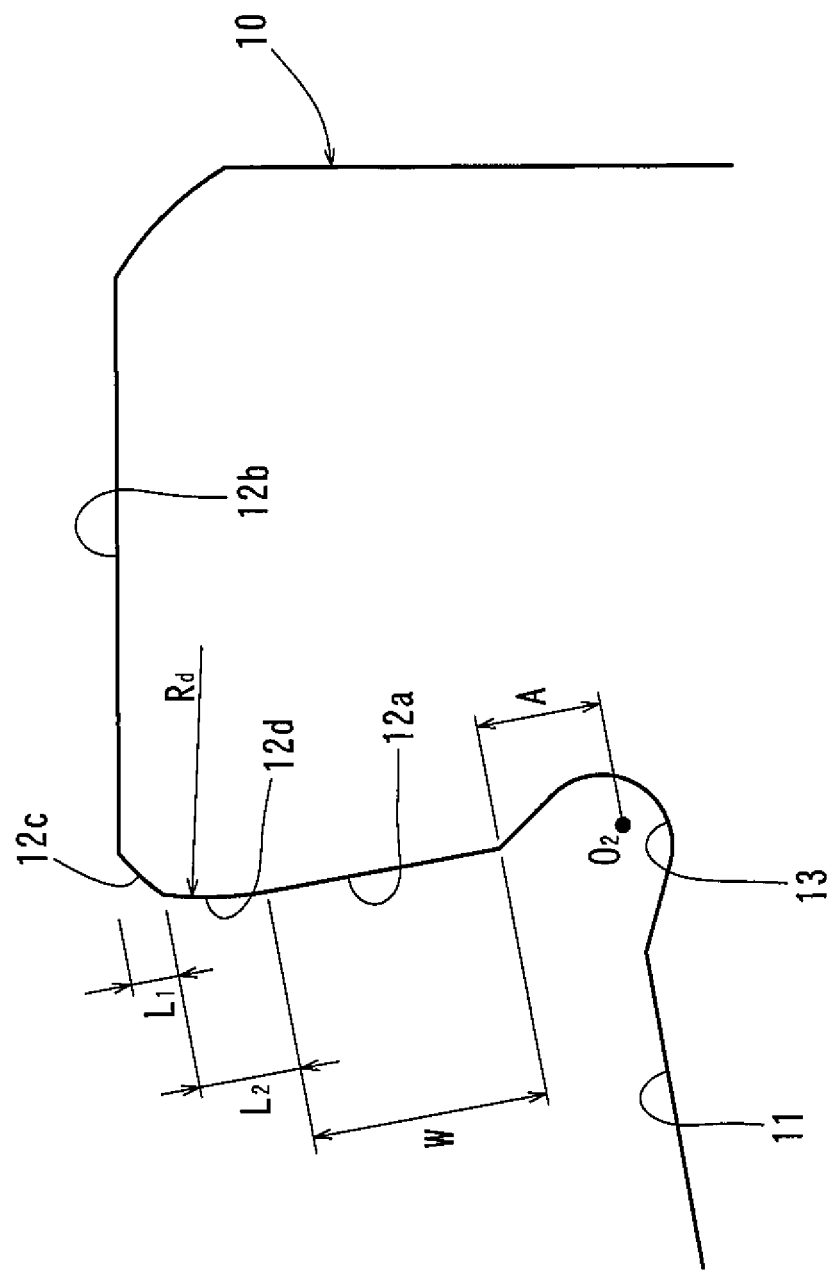
FIG. 8 is a view showing a modification of the generatrix shape in the vicinity of the large flange surface illustrated in FIG. 1.

In order to prevent the large end surfaces 33 of the tapered rollers 30 from coming into sliding contact (edge abutment) with the radially outer edge of the large flange surface 12a of the inner ring 10, an undercut surface may be formed between the large flange surface 12a and the flange-side chamfer 12c in FIG. 1. This modification is shown in FIG. 8. As shown in FIG. 8, an undercut surface 12d is formed between the large flange surface 12a and the flange-side chamfer 12c. The undercut surface 12d bends toward the radially outer surface 12b such that the amount of its bend increases from the radially outer edge of the large flange surface 12a toward the flange-side chamfer 12c. The generatrix of the undercut surface 12d is a circular arc-shaped line having a radius of curvature Rd.

When considering:
(i) the imaginary intersection point between the imaginary line extending from the generatrix of the large flange surface 12a, and the imaginary line extending from the generatrix of the flange-side chamfer 12c;
(ii) the width $L_1$ of the flange-side chamfer 12c, which is the distance, in the direction along the generatrix of the large flange surface 12a, from the above imaginary intersection point to the position equal in diameter to the radially outer surface 12b; and
(iii) the width $L_2$ of the undercut surface 12d, which is the distance, in the direction along the generatrix of the large flange surface 12a, from the radially outer edge of the large flange surface 12a to the above imaginary intersection point, in order to prevent the width $L_2$ of the undercut surface 12d from becoming too small, the radius of curvature Rd of the undercut surface 12d is preferably 2 mm or less. Also, in order to keep the width $L_2$ of the undercut surface 12d as large as possible, the width $L_1$ of the flange-side chamfer 12c is preferably 1 mm or less.

Also, it is preferable to further improve the function by combining together the optimization of the large flange surface 12a of the inner ring 10 as shown in FIGS. 1, 3 and 8 and heat treatment characteristics of the inner ring 10. Specifically, since, if lubrication conditions are severe during the sliding contact between the large end surfaces 33 of the tapered rollers 30 and the large flange surface 12a, surface damage may occur due to metal contact, it is preferable to make the large flange surface 12a have characteristics that delay surface damage.

Specifically, the grain size number of the old austenite crystal grains at the large flange surface 12a of the inner ring 10 is preferably No. 6 or more. The grain size number of old austenite crystal grains is defined in JIS G0551:2013 as "Steels-Micrographic determination of the apparent grain size". The "old austenite crystal grains" refer to austenite crystal grains after quenching. The boundaries (grain boundaries) of the old austenite crystal grains are referred to as old austenite crystal grain boundaries, and the old austenite crystal grains are surrounded by the old austenite crystal grain boundaries. The smaller the grain sizes of the old austenite crystal grains (the larger the grain size number), the slower the speed of damage becomes by the crystal grain boundaries. Therefore, the grain size number suitable for an element whose base is a metal and which comes into sliding contact, such as the large flange surface 12a, is No. 6 or more, preferably No. 10 or more, more preferably No. 11 or more.

It is desirable that the large flange surface 12a of the inner ring 10 is formed by a nitrided layer having a nitrogen content of 0.05 wt % or more, or that the large flange surface 12a has a nitrogen infiltration depth of 0.1 mm or more. Because the nitrided layer having a nitrogen content of 0.05 wt % or more has tempering softening resistance due to its nitrogen enrichment effect, the resistance to local heat buildup at the sliding contact portion of the large flange surface 12a increases. The nitrided layer is a layer formed on the surface layer of the large flange surface 12a and having an increased nitrogen content, and is realized by, e.g., carbonitriding, nitriding or nitrogen infiltrating treatment. The nitrided layer preferably has a nitrogen content of 0.1 wt % or more and 0.7 wt % or less. If the nitrogen content is 0.1 wt % or more, it can be expected that the rolling life improves especially in an environment where foreign matter is present, whereas, if the nitrogen content is more than 0.7 wt %, there is a concern for shortened life due to the formation of holes called voids, or due to reduced hardness resulting from an increased amount of the remaining austenite. The nitrogen content is the value at the surface layer 10 μm of the surface of the large flange surface 12a after grinding, and can be measured by, e.g., EPMA (wavelength dispersion type X-ray micro analyzer).

The inner ring 10, the outer ring 20 and the tapered rollers 30 shown in FIG. 2 are formed of high carbon chromium bearing steel (such as SUJ2 material). The inner ring 10, the outer ring 20 and the tapered rollers 30 are subjected to a heat treatment for forming nitrided layers. This heat treatment may be performed by a method disclosed in JP '027 or by another method. The material of the inner ring 10, the outer ring 20 and the tapered rollers 30 is not limited to high carbon chromium bearing steel. For example, the inner ring 10 and the outer ring 20 may be formed of a carburized steel such as chromium steel or chromium molybdenum steel, and may be subjected to, as the heat treatment, conventional carburizing quenching and tempering.

Tests were conducted to verify the effectiveness of the tapered roller bearing according to the present invention. The verification conditions and the basic specifications of the test bearings in the first test are as follows (hereinafter, see FIGS. 1 to 3 as necessary):

Verification Conditions

Test bearings: Model No. 32008X (JIS millimeter type standard tapered roller bearings)
Bearing size: Φ (mm in diameter) 40×Φ68×19
Lubricating oil: Turbine oil ISO VG32 (viscosity: 32 mm$^2$/s at 40° C., 5.5 mm$^2$/s at 100° C.)
Load condition: Radial load=0.3 Cr (Cr is the basic dynamic load rating)
Rotation speed: 4000 r/min
Amount of lubricating oil: Oil was supplied by dropping at the rate of 4 mL/min Various Parameters of Test Bearings $R_{ACTUAL}/R = 0.41$
Width W of large flange surface 12a=1.55
Surface roughness of large flange surface 12a=0.072 μm Ra
Surface roughness of large end surface 33=0.063 μm Ra
$R/R_{BASE} = 0.81$ Based on, in addition to the above-described basic specifications, the below-shown "applied specifications", in which the undercut widths A of the grinding undercuts 13 of the respective test bearings are different from each other, the test bearings were evaluated. The evaluation results are shown in Table 1.

TABLE 1

| No. | Applied specifications | Evaluation result |
| --- | --- | --- |
| 1 | Undercut width A = 0.28 | ⊚ (Calculated life was satisfied more than enough) Because the temperature of the outer ring did not rise, and test time well exceeded calculated life, the test was terminated with the bearing unbroken. |
| 2 | Undercut width A = 0.43 | ⊚ (Calculated life was satisfied more than enough) Because the temperature of the outer ring did not rise, and test time well exceeded calculated life, the test was terminated with the bearing unbroken. |
| 3 | Undercut width A = 0.50 | ⊚ (Calculated life was satisfied more than enough) Because the temperature of the outer ring did not rise, and test time well exceeded calculated life, the test was terminated with the bearing unbroken. |
| 4 | Undercutn width A = 0.57 | ○ (Calculated life was satisfied enough) Because the temperature of the outer ring showed around 110° C., but test time well exceeded calculated life, the test was terminated with the bearing unbroken. |
| 5 | Undercut width A = 0.62 | Δ (Test time slighly exceeded calculated life) Because the temperature of the outer ring gradually rose to 130° C., the test was terminated. |
| 6 | Undercut width A = 0.74 | X (Calculated life was not satisfied) Because the temperature of the outer ring rose to 150° C. sharply, the test was terminated. |

As shown in Table 1, in each of the test bearings 1 to 4, in which the undercut widths A are 0.57 mm or less, it was possible to reduce a rise in temperature even under severe lubrication conditions, and thus to ensure a sufficient bearing life, whereas, in each of the test bearings 5 and 6, in which the undercut widths A are 0.62 mm or more, it was impossible to reduce a rise in temperature, and thus to expect a sufficient bearing life. In other words, it is considered that setting the undercut width A at 0.5 or less is effective in reducing a rise in temperature even under severe lubrication conditions.

The verification conditions and the basic specifications of the test bearings in the second test are as follows:

Verification Conditions

Test bearings: Model No. 32008X (JIS millimeter type standard tapered roller bearings)

Bearing size: Φ40×Φ68×19
Lubricating oil: Turbine oil ISO VG32 (viscosity: 32 mm$^2$/s at 40° C., 5.5 mm$^2$/s at 100° C.)
Load condition: Radial load=0.3 Cr (Cr is the basic dynamic load rating)
Rotation speed: 4000 r/min
Amount of lubricating oil: Oil was supplied by dropping at the rate of 4 mL/min Various Parameters of Test Bearing $R_{ACTUAL}/R$=0.51
Width W of large flange surface 12a=1.67
Surface roughness of large flange surface 12a=0.035 μm Ra
Surface roughness of large end surface 33=0.037 μm Ra
$R/R_{BASE}$=0.83
In the second test, based on, in addition to the above-described basic specifications, the below-shown "applied specifications", in which, with the ratios of the cone angles β to the angles ρ of the respective test bearings set at the same value, the undercut widths A are different from each other, the test bearings were evaluated. The evaluation results are shown in Table 2.

TABLE 2

| No. | Applied specifications | | Evaluation result |
| --- | --- | --- | --- |
| 7 | Undercut width A = 0.29 | B/ρ = 6.5 | ◉ (Calculated life was satisfied more than enough) Because the temperature of the outer ring did not rise, and test time well exceeded calculated life, the test was terminated with the bearing unbroken. |
| 8 | Undercut width A = 0.44 | B/ρ = 6.5 | ◉ (Calculated life was satisfied more than enough) Because the temperature of the outer ring did not rise, and test time well exceeded calculated life, the test was terminated with the bearing unbroken. |
| 9 | Undercut width A = 0.51 | B/ρ = 6.5 | ◉ (Calculated life was satisfied more than enough) Because the temperature of the outer ring did not rise, and test time well exceeded calculated life, the test was terminated with the bearing unbroken. |
| 10 | Undercut width A = 0.59 | B/ρ = 6.5 | ○ (Calculated life was satisfied enough) Because the temperature of the outer ring showed around 110° C., but test time well exceeded calculated life, the test was terminated with the bearing unbroken. |
| 11 | Undercut width A = 0.65 | B/ρ = 6.5 | Δ (Test time slightly exceeded calculated life) Because the temperature of the outer ring gradually rose to 130° C., the test was terminated. |
| 12 | Undercut width A = 0.78 | B/ρ = 6.5 | X (Calculated life was not satisfied) Because the temperature of the outer ring rose to 150° C. sharply, the test was terminated. |

As shown in Table 2, in each of the test bearings 7 to 10, in which, with the β/ρ value set at 6.5, the undercut width A is 0.59 mm or less, it was possible to reduce a rise in temperature even under severe lubrication conditions, and thus to ensure a sufficient bearing life, whereas, in each of the test bearings 11 and 12, in which, with the β/ρ value set at 6.5, the undercut width A is 0.65 mm or more, it was impossible to reduce a rise in temperature, and thus to expect a sufficient bearing life.

The verification conditions and the basic specifications of the test bearings in the third test are as follows:

Verification Conditions

Test bearings: Model No. 32008X (JIS millimeter type standard tapered roller bearings)
Bearing size: Φ40×Φ68×19
Lubricating oil: Turbine oil ISO VG32 (viscosity: 32 mm$^2$/s at 40° C., 5.5 mm$^2$/s at 100° C.)
Load condition: Radial load=0.3 Cr (Cr is the basic dynamic load rating)
Rotation speed: 4000 r/min
Amount of lubricating oil: Oil was supplied by dropping at the rate of 4 mL/min Various Parameters of the Test Bearings $R_{ACTUAL}/R$=0.55
Width W of large flange surface 12a=1.52
Surface roughness of large flange surface 12a=0.046 μm Ra
Surface roughness of large end surface 33=0.047 μm Ra
$R/R_{BASE}$=0.86
In the third test, based on, in addition to the above-described basic specifications, the below-shown "applied specifications", in which, with the undercut widths A set at the same value, the ratios of the cone angles β to the respective angles ρ of the respective test bearings are different from each other, the test bearings were evaluated. The evaluation results are shown in Table 3.

TABLE 3

| No. | Applied specifications | | Evaluation result |
| --- | --- | --- | --- |
| 13 | Undercut width A = 0.50 | B/ρ = 9.0 | ◉ (Calculated life was satisfied more than enough) Because the temperature of the outer ring did not rise, and test time well exceeded calculated life, the test was terminated with the hearing unbroken. |
| 14 | Undercut width A = 0.50 | B/ρ = 7.5 | ◉ (Calculated life was satisfied more than enough) Because the temperature of the outer ring did not rise, and test time well exceeded calculated life, the test was terminated with the bearing unbroken. |
| 15 | Undercut width A = 0.50 | B/ρ = 6.1 | ◉ (Calculated life was satisfied more than enough) Because the temperature of the outer ring did not rise, and test time well exceeded calculated life, the test was terminated with the bearing unbroken. |
| 16 | Undercut width A = 0.50 | B/ρ = 5.7 | ○ (Calculated life was satisfied enough) Because the temperature of the outer ring showed around 110° C., but test time well exceeded calculated life, the test was terminated with the bearing unbroken. |
| 17 | Undercut width A = 0.50 | B/ρ = 5.5 | Δ (Test time slighly exceeded calculated life) Because the temperature of the outer ring gradually rose to 130° C., the test was terminated. |

TABLE 3-continued

| No. | Applied specifications | Evaluation result |
|---|---|---|
| 18 | Undercut width B/p = 5.0 A = 0.50 | X (Calculated life was not satisfied) Because the temperature of the outer ring rose to 150° C. sharply, the test was terminated. |

As shown in Table 3, in each of the test bearings 13 to 16, in which, with the undercut width A set at 0.5 mm, the β/ρ values are 5.7 or more, it was possible to reduce a rise in temperature even under severe lubrication conditions, and thus to ensure a sufficient bearing life, whereas, in each of the test bearings 17 and 18, in which, with the undercut widths A set at 0.5 mm, the β/ρ values are 5.5 or less, it was impossible to reduce a rise in temperature, and thus to expect a sufficient bearing life. In view of the results of the second and third tests, it is considered that setting the undercut width A at 0.5 or less and adopting β/6≥ρ is effective in reducing a rise in temperature even under severe lubrication conditions.

In the tapered roller bearing of the present invention, as described above, since the undercut width A of the grinding undercut 13 of the inner ring 10 is set at a particularly small dimension, i.e., 0.5 mm or less, the width W of the large flange surface 12 is wide enough to receive the large end surfaces 33 of the tapered rollers 30. Therefore, it is possible to optimize the contact relationship between the large flange surface 12a and the large end surfaces 33; and generate a good wedge effect between the large flange surface 12a and the large end surfaces 33 so as to improve the oil film forming capability at the sliding contact portions of the large flange surface 12a and the large end surfaces 33. Therefore, even if this tapered roller bearing is used under sever lubrication conditions, it is possible to prevent a sharp rise in temperature and rotate the bearing smoothly.

For example, if the lubrication conditions are particularly severe and the lubrication of the sliding contact portions of the large flange surface 12a and the large end surfaces 33 is or close to the boundary film lubrication, the large flange surface 12a may become worn. If the wear of the large flange surface 12a reaches the grinding undercut 13, and the large end surfaces 33 and the radially inner edge of the large flange surface 12a come into edge abutment with each other, a large stress concentration will occur, thereby destabilizing the sliding behavior of the tapered rollers 30. This may lead to a sharp rise in temperature. In contrast, in the tapered roller bearing of the present invention, even if the large flange surface 12a becomes worn, since the width W of the large flange surface 12a is large, the large flange surface 12a is sufficiently opposed to the large end surfaces 33, and also since the grinding undercut 13 (undercut width A) is small, the wear of the large flange surface 12a does not reach the boundary between the large flange surface 12a the grinding undercuts 13 (radially inner edge of the large flange surface 12a), and the end area of the large flange surface 12a on its radially inner side remains. Therefore, even under such particularly sever lubrication conditions, it is possible to properly keep the large flange surface 12a and the large end surfaces 33 in contact with each other.

Also, in this tapered roller bearing, since the relationship between the cone angle β of each tapered roller 30 and the angle ρ is set at β/6≥ρ, the radial contact point height H relative to the reference point O₂, of each large end surface 33 and the large flange surface 12a of the inner ring 10 is low. Therefore, it possible to prevent a rise in the sliding velocity at the sliding contact portions of the large flange surface 12a and the large end surfaces 33, thereby reducing heat buildup at the large flange surface 12a and thus to prevent a sharp rise in temperature.

As described above, in this tapered roller bearing, it is possible to optimize the contact relationship between the large flange surface 12a of the inner ring 10 and the large end surfaces 33 of the tapered rollers 30, such that the oil film forming capability at the sliding contact portions improves, thereby preventing a rise in the sliding velocity at the sliding contact portions. Thus, even if the tapered roller bearing is used under sever lubrication conditions, it is possible to prevent a sharp rise in temperature, and rotate the bearing smoothly.

Also, in this tapered roller bearing, since the relationship between the approach angles a and b of the grinding undercut 13 of the inner ring 10 is set at a>b, and the relationship between the undercut widths A and B is set at A<B, it is possible to improve the turning machinability of the grinding undercut 13, and, to alleviate the influence of any overshoot or undershoot of the ground amount of the large flange surface 12a, on the amount of change in the width W of the large flange surface 12a (influence on the undercut width A). Also, it is possible to easily form the large flange surface 12a by grinding. Therefore, in this tapered roller bearing, it is possible to reduce the machining cost, and thus the entire cost of the bearing.

Also, in this tapered roller bearing, since the relationship between the depths c and d of the grinding undercut 13 of the inner ring 10 is set at c>d, it is possible to reduce the stress of the large flange 12 caused by loads applied from the large end surfaces 33 of the tapered rollers 30 to the large flange surface 12a of the inner ring 10, and to improve the strength of the large flange 12. This is advantageous in reducing the inclination of the large flange 12 due to, e.g., disturbance, and in keeping a proper contact state between large flange surface 12a and the large end surfaces 33.

Also, in this tapered roller bearing, since the depth d of the grinding undercut 13 of the inner ring 10 is 0.3 mm or less, it is possible to reliably improve the strength of the large flange 12.

Also, in this tapered roller bearing, since the approach angle a of the grinding undercut 13 of the inner ring 10 is set within the range of 20°≤a≤50°, it is possible to alleviate the influence of any overshoot or undershoot of the ground amount of the large flange surface 12a, on the amount of change in the width W of the large flange surface 12a (influence on the undercut width A). It is thus possible to easily control the width W of the large flange surface 12a (undercut width A).

Also, in this tapered roller bearing, since the width W of the large flange surface 12a of the inner ring 10 is set at a value that satisfies the above-shown Formula 1, it is possible to make the large flange surface 12a sufficiently opposed to the large end surfaces 33. Therefore, even if the sliding contact portions of the large end surfaces 33 and the large flange surface 12a are displaced radially outwardly of the large flange by disturbance, it is possible to keep a good contact state therebetween.

Also, in this tapered roller bearing, since the grain size number of old austenite crystal grains in the large flange surface 12a of the inner ring 10 is No. 6 or more, it is possible to delay its surface damage due to metal contact with the large end surfaces 33 of the tapered rollers 30.

Also, in this tapered roller bearing, since the large flange surface 12a of the inner ring 10 is formed by a nitrided layer having a nitrogen content of 0.05 wt % or more, it is possible to delay its surface damage due to metal contact with the large end surfaces 33 of the tapered rollers 30.

Also, in this tapered roller bearing, since the large flange surface 12*a* of the inner ring 10 has a surface roughness of 0.1 μm Ra or less, and the large end surfaces 33 of the tapered rollers 30 have a surface roughness of 0.12 μm Ra or less, it is possible to improve oil film formation by improving the oil film parameter between the large flange surface 12*a* and the large end surfaces 33.

Also, even if the $R/R_{BASE}$ values are 0.70 or more and 0.95 or less, and the $R_{ACTUAL}/R$ value for at least one of the plurality of tapered rollers 30 is 0.3 or more and less than 0.5, this tapered roller bearing can be used under sever lubrication conditions, and yet it is possible to improve the yield rate of the tapered rollers 30, and thus to provide the bearing at a relatively low cost, compared to the tapered roller bearing of JP '027.

Figure 9:
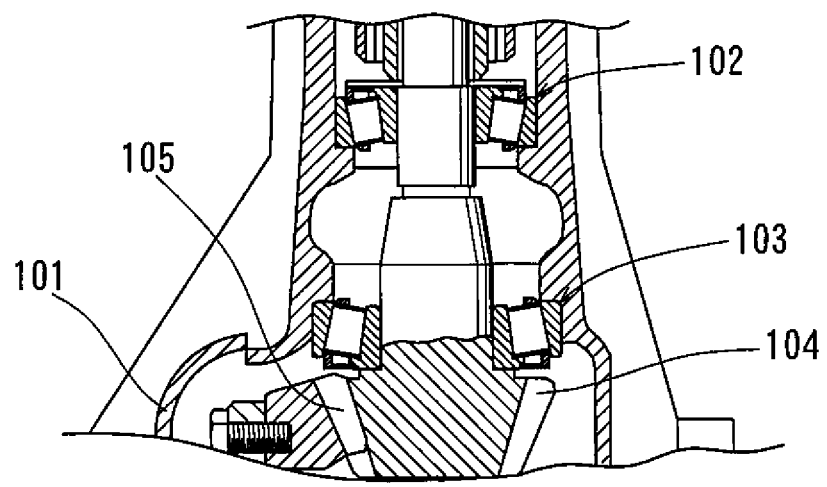
FIG. 9 is a sectional view of a differential for an automobile in which tapered roller bearings as illustrated in FIG. 2 are mounted.

The tapered roller bearing of the present invention can be suitably used to support a rotary shaft of a transmission or a differential for an automobile in an environment where lubricating oil is supplied into the bearing from outside by splashing or oil bath lubrication. An example of use thereof is now described with reference to FIG. 9. FIG. 9 illustrates a differential for an automobile.

The differential of FIG. 9 includes a drive pinion 104 supported by two tapered roller bearings 102 and 103 so as to be rotatable relative to a housing 101; a ring gear 105 in mesh with the drive pinion 104; and a differential gear mechanism (not shown), and these components are received in the housing 101, in which gear lubricating oil is sealed. This gear lubricating oil is used to lubricate the tapered roller bearings 102 and 103, too, and is supplied to the side surfaces of the bearings by a splashing or oil bath lubrication method.

Figure 10:
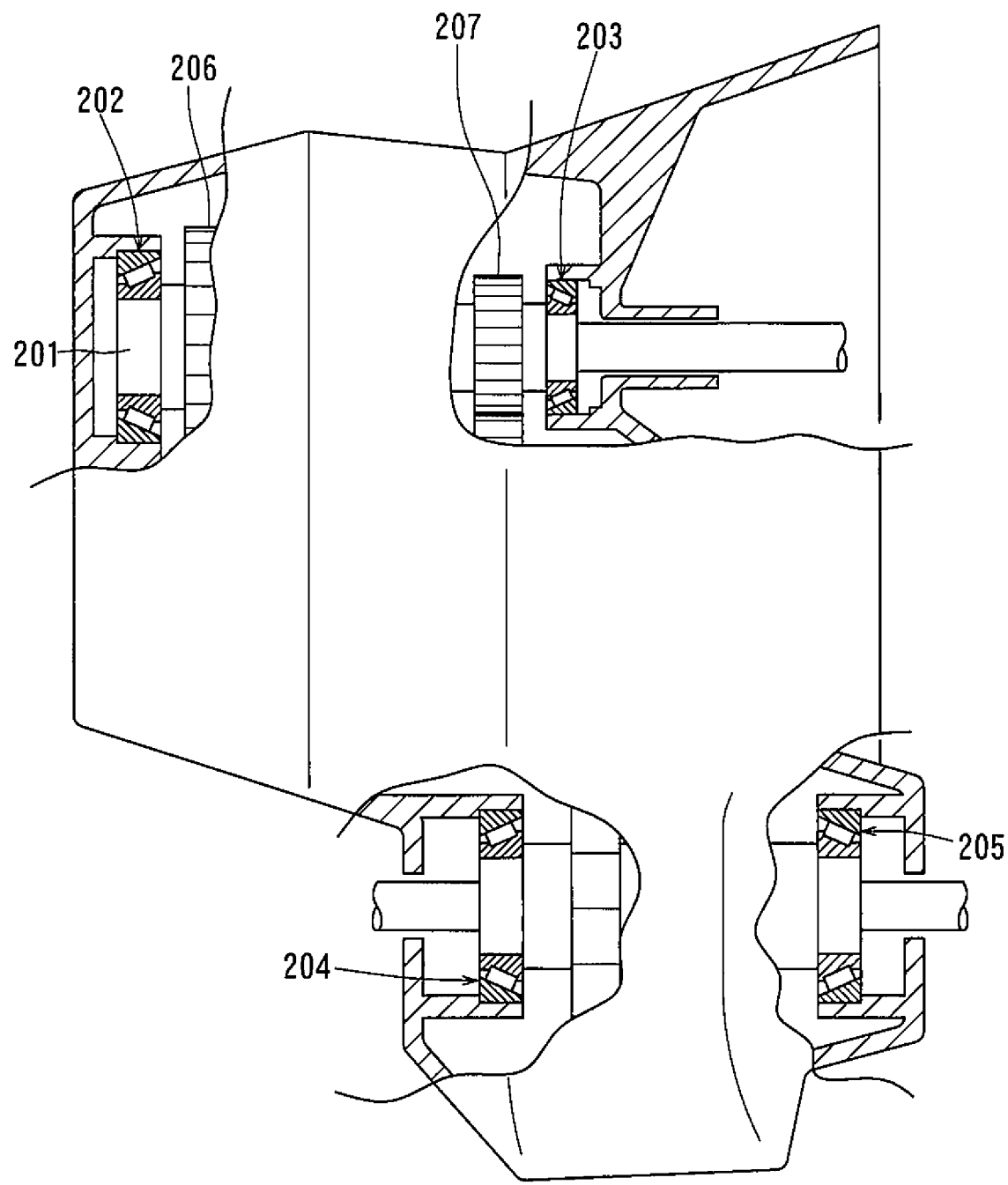
FIG. 10 is a sectional view of a transmission for an automobile in which tapered roller bearings as illustrated in FIG. 2 are mounted.

Another example of use of the tapered roller bearing according to the present invention is now described with reference to FIG. 10. FIG. 10 illustrates a transmission for an automobile.

The transmission of FIG. 10 is a multi-speed transmission, which changes the gear ratio in a stepwise manner, and includes tapered roller bearings 202 to 205 according to any one of the above-described embodiments which rotatably support its rotary shafts (e.g., an input shaft 201 to which the rotation of the engine is inputted). The shown transmission is configured such that, by selectively engaging any one of clutches (not shown), the rotation of the input shaft 201 is transmitted through the selected one of gear trains 206 and 207 to an output shaft in the selected gear ratio. Also, this transmission is configured such that lubricating oil (transmission lubricating oil) splashed due to the rotation of gears is supplied to the side surfaces of the tapered roller bearings 202 to 205.

Since each of the tapered roller bearings 102, 103 and 202 to 205 shown in FIGS. 9 and 10 corresponds to the tapered roller bearing of the present invention shown in, e.g., FIG. 1, even in a lubrication environment where oil is diluted to save fuel, it is possible to prevent a sharp rise in temperature due to the sliding contact between the large flange surface of the inner ring and the large end surfaces of the tapered rollers, by the initial lubrication when the bearing starts to operate. Also, even when the temperature of the bearing during its operation rises and the viscosity of lubricating oil decreases, it is possible to suitably form an oil film by keeping a stable sliding contact state therebetween, and thus to prevent damage to these surfaces.

The tapered roller bearing of the present invention is not limited to use in transmissions, and can be used under other extremely sever lubrication conditions, too. The above-described embodiments are mere examples in every respect, and the present invention is not limited thereto. Therefore, the scope of the present invention is indicated not by the above description but by the claims, and should be understood to include all modifications within the scope and meaning equivalent to the scope of the claims.

DESCRIPTION OF REFERENCE NUMERALS

10: Inner ring
11: Raceway surface
12: Large flange
12*a*: Large flange surface
13: Grinding undercut
20: Outer ring
30: Tapered roller
31: Rolling surface
33: Large end surface
102, 103, 202 to 205: Tapered roller bearing
104: Drive pinion (rotary part)
201: Input shaft (rotary part)

The invention claimed is:

1. A tapered roller bearing comprising:
an inner ring;
an outer ring;
a plurality of tapered rollers disposed between the inner ring and the outer ring; and
a cage in which the tapered rollers are received, wherein each of the tapered rollers has:
a conical rolling surface;
a chamfer continuous with a large-diameter side of the rolling surface; and
a large end surface continuous with the chamfer, wherein the inner ring has:
a conical raceway surface;
a large flange surface configured to receive the large end surfaces of the tapered rollers; and
a groove-shaped grinding undercut connecting the large flange surface and the raceway surface to each other, and
wherein the grinding undercut has an undercut width A of 0.5 mm or less from a reference point to the large flange surface, the reference point being an intersection point of an imaginary line extending from a generatrix of the raceway surface toward the grinding undercut, and an imaginary line extending from a generatrix of the large flange surface toward the grinding undercut.

2. The tapered roller bearing according to claim 1, wherein, when considering a cone angle β of each of the rolling surfaces, and an acute angle ρ of an imaginary line connecting together a vertex of the cone angle β and a contact point of the large flange surface and the large end surface of each of the tapered rollers, relative to the generatrix of the raceway surface, a relationship between β and ρ is $\beta/6 \geq \rho$.

3. The tapered roller bearing according to claim 2, wherein, when considering an approach angle a of the grinding undercut relative to the large flange surface of the inner ring, and an approach angle b of the grinding undercut relative to the raceway surface, a relationship between a and b is a>b, and
wherein, when considering the undercut width A from the reference point to the large flange surface, and an undercut width B from the reference point to the raceway surface, a relationship between A and B is A<B.

4. The tapered roller bearing according to claim 2, wherein, when considering a depth c of the grinding undercut relative to the raceway surface of the inner ring, and a depth d of the grinding undercut relative to the large flange surface, a relationship between c and d is c>d.

5. The tapered roller bearing according to claim 2, wherein a depth d of the grinding undercut relative to the large flange surface of the inner ring is 0.3 mm or less.

6. The tapered roller bearing according to claim 2, wherein an approach angle a of the grinding undercut relative to the large flange surface of the inner ring is within a range of $20° \leq a \leq 50°$.

7. The tapered roller bearing according to claim 2, wherein a width W of the large flange surface satisfies the following Formula 1:

$$W \geq \{Dw \times (1/2) \times \tan\theta / (L/Dw)\}, \qquad \text{<Formula 1>}$$

where θ is an acute angle of the generatrix of the raceway surface relative to a center axis of the inner ring; Dw is a large-end diameter of the rolling surface of each of the tapered rollers; and L is a roller length of each of the tapered rollers.

8. The tapered roller bearing according to claim 2, wherein, when considering set radii of curvature R of the large end surfaces of the respective tapered rollers, and base radii of curvature $R_{BASE}$ from the vertexes of the cone angles of the respective rolling surfaces to the large flange surface of the inner ring, the $R/R_{BASE}$ values are 0.70 or more and 0.95 or less, and wherein, when considering actual radii of curvature $R_{ACTUAL}$ of the large end surfaces of the respective tapered rollers, at least one of the $R_{ACTUAL}/R$ values is 0.3 or more.

9. The tapered roller bearing according to claim 1, wherein, when considering an approach angle a of the grinding undercut relative to the large flange surface of the inner ring, and an approach angle b of the grinding undercut relative to the raceway surface, a relationship between a and b is a>b, and wherein, when considering the undercut width A from the reference point to the large flange surface, and an undercut width B from the reference point to the raceway surface, a relationship between A and B is A<B.

10. The tapered roller bearing according to claim 9, wherein the approach angle a of the grinding undercut relative to the large flange surface of the inner ring is within a range of $20° \leq a \leq 50°$.

11. The tapered roller bearing according to claim 1, wherein, when considering a depth c of the grinding undercut relative to the raceway surface of the inner ring, and a depth d of the grinding undercut relative to the large flange surface, a relationship between c and d is c>d.

12. The tapered roller bearing according to claim 11, wherein the depth d of the grinding undercut relative to the large flange surface of the inner ring is 0.3 mm or less.

13. The tapered roller bearing according to claim 1, wherein a depth d of the grinding undercut relative to the large flange surface of the inner ring is 0.3 mm or less.

14. The tapered roller bearing according to claim 1, wherein an approach angle a of the grinding undercut relative to the large flange surface of the inner ring is within a range of $20° \leq a \leq 50°$.

15. The tapered roller bearing according to claim 1, wherein a width W of the large flange surface satisfies the following Formula 1:

$$W \geq \{Dw \times (1/2) \times \tan\theta / (L/Dw)\}, \qquad \text{<Formula 1>}$$

where θ is an acute angle of the generatrix of the raceway surface relative to a center axis of the inner ring; Dw is a large-end diameter of the rolling surface of each of the tapered rollers; and L is a roller length of each of the tapered rollers.

16. The tapered roller bearing according to claim 1, wherein a grain size number of old austenite crystal grains in the large flange surface of the inner ring is No. 6 or more.

17. The tapered roller bearing according to claim 1, wherein the large flange surface of the inner ring is formed by a nitrided layer having a nitrogen content of 0.05 wt % or more.

18. The tapered roller bearing according to claim 1, wherein the large flange surface of the inner ring has a surface roughness of 0.1 µm Ra or less, and the large end surface of each of the tapered rollers has a surface roughness of 0.12 µm Ra or less.

19. The tapered roller bearing according to claim 1, wherein, when considering set radii of curvature R of the large end surfaces of the respective tapered rollers, and base radii of curvature $R_{BASE}$ from the vertexes of the cone angles of the respective rolling surfaces to the large flange surface of the inner ring, the $R/R_{BASE}$ values are 0.70 or more and 0.95 or less, and wherein, when considering actual radii of curvature $R_{ACTUAL}$ of the large end surfaces of the respective tapered rollers, at least one of the $R_{ACTUAL}/R$ values is 0.3 or more.

20. The tapered roller bearing according to claim 1, supporting a rotatory part disposed in a transmission or a differential of an automobile.

* * * * *